US012744383B2

(12) United States Patent
Yang et al.

(10) Patent No.: US 12,744,383 B2
(45) Date of Patent: Sep. 22, 2026

(54) SYSTEM AND METHOD FOR UNBALANCE ADJUSTMENT FOR INVERTER SPLIT-PHASE CONTROLLING AND DISTRIBUTION TRANSFORMER CURRENT

(71) Applicant: ELECTRIC POWER RESEARCH INSTITUTE OF YUNNAN POWER GRID CO. , LTD, Kunming (CN)

(72) Inventors: Jindong Yang, Kunming (CN); Hongwen Liu, Kunming (CN); Fei Rong, Kunming (CN)

( * ) Notice: Subject to any disclaimer, the term of this patent is extended or adjusted under 35 U.S.C. 154(b) by 429 days.

(21) Appl. No.: 18/558,340

(22) PCT Filed: Feb. 14, 2023

(86) PCT No.: PCT/CN2023/075847

§ 371 (c)(1),
(2) Date: Oct. 31, 2023

(87) PCT Pub. No.: WO2024/001203

PCT Pub. Date: Jan. 4, 2024

(65) Prior Publication Data

US 2024/0380209 A1 Nov. 14, 2024

(30) Foreign Application Priority Data

Jun. 27, 2022 (CN) ......................... 202210738084.3

(51) Int. Cl.
*H02J 3/26* (2026.01)
*H02J 101/24* (2026.01)
*H02M 7/5387* (2007.01)

(52) U.S. Cl.
CPC ........... *H02J 3/26* (2013.01); *H02M 7/53871* (2013.01); *H02J 2101/24* (2026.01)

(58) Field of Classification Search
None
See application file for complete search history.

(56) References Cited

FOREIGN PATENT DOCUMENTS

| | | | | |
|---|---|---|---|---|
| CN | 105449709 A | | 3/2016 | |
| CN | 106532736 A | | 3/2017 | |
| CN | 110323767 B | * | 10/2020 | ............ H02J 3/0014 |

OTHER PUBLICATIONS

English Translation of CN-110323767-B (Year: 2020).*

* cited by examiner

*Primary Examiner* — Ryan A Jarrett

(57) ABSTRACT

In the present invention, a system and a method for unbalance adjustment for inverter split-phase controlling and distribution transformer current are provided, in which the system for unbalance adjustment for inverter split-phase controlling and distribution transformer current includes a distributed power supply and a three-phase full-bridge inverter. The three-phase full-bridge inverter is connected to the distributed power supply, and the three-phase full-bridge inverter is connected to a three-phase line through a three-phase reactor. When an unbalance degree corresponding to the three-phase line is greater than a preset starting value, a three-phase compensation current reference value is obtained according to the present front-end three-phase load current, back-end three-phase load current and capacitor voltage control component, such that the three-phase full-bridge inverter can output the three-phase compensation current based on the three-phase compensation current reference value. Therefore, in embodiments of the present invention, the three-phase full-bridge inverter can use the output power of the distributed power supply to output the compensation current required for each phase of the three-phase line, realizing the unbalanced control in the three-phase current of the distribution transformer, so that the three-phase current of the distribution transformer reaches balance.

7 Claims, 7 Drawing Sheets

S410 obtaining a filtered voltage, which is configured to characterize a voltage between the positive terminal and the negative terminal at the first filter capacitor and the second filter capacitor connected in series

S420 calculating a difference between the filtered voltage and a preset voltage reference value to obtain a capacitor voltage difference

S430 inputting the capacitor voltage difference into the PI controller to obtain a D-axis active component required for phase coordinate transformation processing

S440 performing phase coordinate transformation processing according to the D-axis active component and a preset Q-axis reactive component to obtain the a-phase capacitor voltage control component, the b-phase capacitor voltage control component, and the c-phase capacitor voltage control component, wherein, the Q axis reactive component is preset to be zero

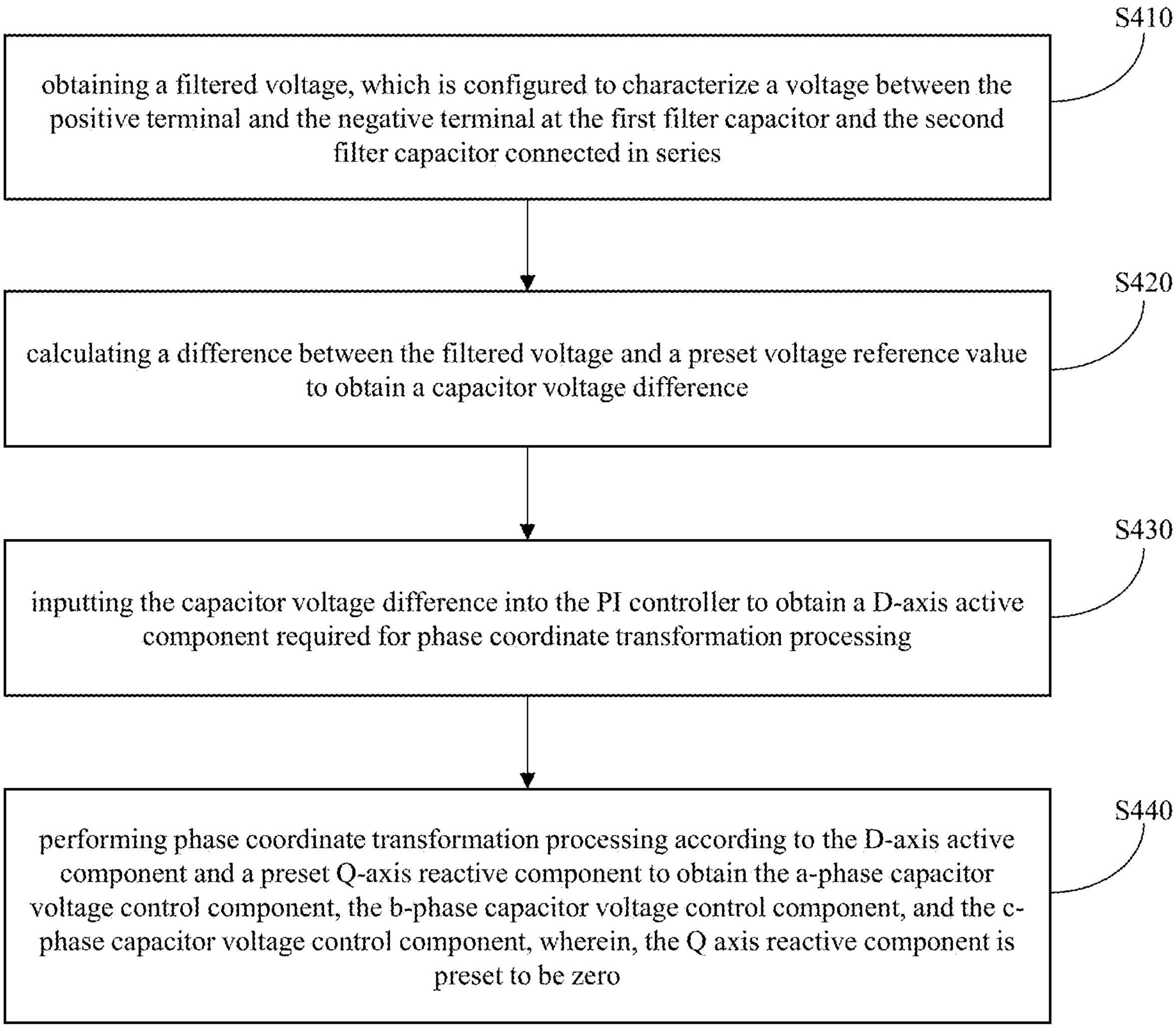

FIG. 5

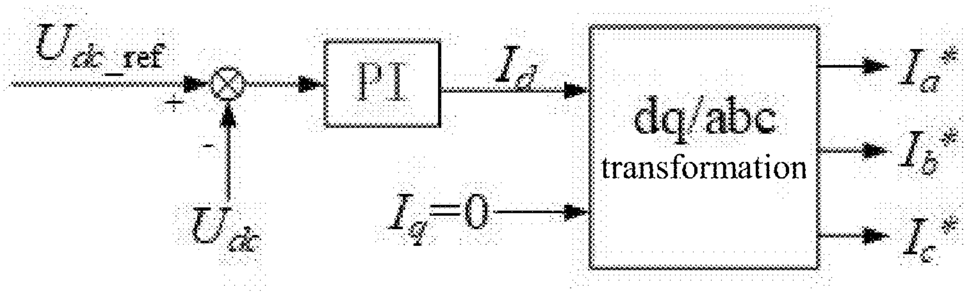

FIG. 6

SYSTEM AND METHOD FOR UNBALANCE ADJUSTMENT FOR INVERTER SPLIT-PHASE CONTROLLING AND DISTRIBUTION TRANSFORMER CURRENT

TECHNICAL FIELD

The invention relates to a technical field of electric power systems, and in particular to a system and method for unbalance adjustment for inverter split-phase controlling and distribution transformer current.

BACKGROUND

With the advancement of new power system construction, a large number of single-phase distributed power sources are being integrated into a transformer area. Due to this situation and the randomness, intermittency, and varied electricity consumption habits of both distributed power sources and household single-phase loads, the on-off cycles of these sources in coordination with the single-phase loads have led to difficulties in achieving balanced distribution of load currents across the three-phases, A, B, C, of distribution transformers. This phenomenon has caused certain phases to experience excessive overloads, significantly impacting the operational lifetime of the distribution transformers and even resulting in their failure. In the related techniques, single-phase active power filters (APFs) are used to compensate zero-sequence currents by generating output currents equal in magnitude but opposite in direction to phase currents. This approach is made for aiming to achieve three-phase balance in distribution grid systems. However, this method fails to effectively utilize the control resources of inverters with the extensive integration of distributed power sources, requiring extra equipment and costs. Moreover, it doesn't facilitate decentralized control and on-site power balancing within the transformer area, leading to significant losses.

Therefore, achieving complete three-phase balance in distribution transformers has become a crucial technical challenge for persons skilled in the art.

SUMMARY OF INVENTION

In view of this, the present invention provides a system and a method for unbalance adjustment for inverter split-phase controlling and distribution transformer current, so as to solve the three-phase unbalance problem of the distribution network system in the existing technology.

In order to achieve one, part or all of the above objects, or other objects, the first aspect of the present invention provides a system and a method for unbalance adjustment for inverter split-phase controlling and distribution transformer current, which can be applied to a power distribution system. The power distribution system includes a distribution transformer and an a-phase line, a b-phase line, a c-phase line, and a neutral line n connected to a low voltage side of the distribution transformer; the system for unbalance adjustment for inverter split-phase controlling and distribution transformer current includes:

- a distributed power supply equipped with a positive power output terminal and a negative power output terminal;
- a three-phase full-bridge inverter provided with a positive inverter input terminal, a negative inverter input terminal, an inverter a-phase output terminal, an inverter b-phase output terminal, and an inverter c-phase output terminal, wherein the positive inverter input terminal is connected to the positive power output terminal, the negative inverter input terminal is connected to the negative power output terminal, the inverter a-phase output terminal, the inverter b-phase output terminal, and the inverter c-phase output terminal are connected to the a-phase line, the b-phase line, and the c-phase line, respectively, through a three-phase reactor; wherein the three-phase full-bridge inverter is configured to output corresponding compensation currents to the a-phase line, the b-phase line, and the c-phase line, respectively, through the three-phase reactor, so as to perform three-phase unbalance adjustment;
- a first filter capacitor connected to the positive inverter input terminal and the positive power output terminal;
- a second filter capacitor connected in series with the first filter capacitor, wherein the second filter capacitor is connected to the negative inverter input terminal and the negative power output terminal, and the neutral line n is connected between the first filter capacitor and the second filter capacitor.

Preferably, the distributed power supply adopts distributed photovoltaic power supply, and the total output power of the distributed photovoltaic power supply complies with the power required to realize three-phase current imbalance control.

Preferably, when the load currents of the a-phase line, the b-phase line, and the c-phase line are unbalanced, the distributed power supply operates in the maximum power mode. The three-phase full-bridge inverter outputs a compensation current for each phase based on the load currents of the a-phase line, the b-phase line and the c-phase line, respectively, to adjust the current of each phase of the distribution transformer to a balanced state;

- when the load currents of the a-phase line, the b-phase line, and the c-phase line are balanced, the power output to the a-phase line, the b-phase line and the c-phase line by the three-phase full-bridge inverter is equal, and the total output power of the three-phase full-bridge inverter is equal to the total output power of the distributed photovoltaic power supply.

In a second aspect, embodiments of the present invention further provide a method for unbalance adjustment for inverter split-phase controlling and distribution transformer current, which can be applied to the system for unbalance adjustment for inverter split-phase controlling and distribution transformer current of the embodiments of the first aspect as afore-described above, in which the method includes:

- obtaining the initial unbalance degree according to the a-phase load current of the a-phase line, the b-phase load current of the b-phase line, and the c-phase load current of the c-phase line at the low-voltage side of the distribution transformer;
- when the initial unbalance degree reaches a preset starting value, obtaining an a-phase front-end load current, a b-phase front-end load current, and a c-phase front-end load current at the front-end load side of the three-phase full-bridge inverter, and an a-phase back-end load current, a b-phase back-end load current, and a c-phase back-end load current at the back-end load side of the three-phase full-bridge inverter;
- performing sequence component decomposition processing, according to the a-phase front-end load current, the b-phase front-end load current, the c-phase front-end load current, the a-phase back-end load current, the b-phase back-end load current, and the c-phase back-end load, to obtain correspondingly an a-phase negative sequence current, a b-phase negative sequence current, and a c-phase negative sequence current, and an a-phase zero-sequence current, a b-phase zero-sequence current, and a c-phase zero-sequence current;

performing calculation to obtain an a-phase capacitor voltage control component, a b-phase capacitor voltage control component, and a c-phase capacitor voltage according to the voltage between the positive and negative terminals at the first filter capacitor and the second filter capacitor which are connected in series and a preset reference voltage;

obtaining an a-phase compensation current reference value according to the a-phase negative sequence current, the a-phase zero sequence current, and the a-phase capacitor voltage control component, obtaining an b-phase compensation current reference value according to the b-phase negative sequence current, the b-phase zero sequence current, and the b-phase capacitor voltage control component, obtaining a c-phase compensation current reference value according to the c-phase negative sequence current, the c-phase zero sequence current, and the c-phase capacitor voltage control component;

outputting correspondingly an a-phase compensation current, a b-phase compensation current, and a c-phase compensation current to the a-phase line, the b-phase line, and the c-phase line, respectively, and making the outputted a-phase compensation current, the outputted b-phase compensation current, and the outputted c-phase compensation current track the a-phase compensation current reference value, the b-phase compensation current reference value, and the c-phase compensation current reference value, respectively, through hysteresis controlling, so as to adjust unbalance current by phase.

Preferably, in embodiments of the present invention, the method for unbalance adjustment for inverter split-phase controlling and distribution transformer current further includes:

obtaining a present unbalance degree, which is determined by the present a-phase load current, the present b-phase load current, and the present c-phase load current;

when the present unbalance degree reaches a preset setting value, updating the output a-phase compensation current, the output b-phase compensation current, and the output c-phase compensation current, according to the present a-phase load current, the present b-phase load current, the present c-phase load current, the present a-phase capacitor voltage control component, the present b-phase capacitor voltage control component, and the present c-phase capacitor voltage control component.

The performing the sequence component decomposition processing, according to the a-phase front-end load current, the b-phase front-end load current, the c-phase front-end load current, the a-phase back-end load current, the b-phase back-end load current, and the c-phase back-end load, to obtain correspondingly an a-phase negative sequence current, a b-phase negative sequence current, and a c-phase negative sequence current, and the a-phase zero-sequence current, the b-phase zero-sequence current, and the c-phase zero-sequence current includes:

finding a difference between the a-phase front-end load current and the a-phase back-end current to obtain the a-phase current difference, finding a difference between the b-phase front-end load current and the b-phase back-end current to obtain the b-phase current difference, finding a difference between the c-phase front-end load current and the c-phase back-end current to obtain the c-phase current difference;

performing sequence component decomposition processing on the a-phase current difference, the b-phase current difference, and the c-phase current difference to obtain correspondingly a-phase negative sequence current, the b-phase negative sequence current, and the c-phase negative sequence current, and the a-phase zero-sequence current, the b-phase zero-sequence current, and the c-phase zero-sequence current.

Preferably, the obtaining the a-phase compensation current reference value according to the a-phase negative sequence current, the a-phase zero sequence current, and the a-phase capacitor voltage control component, obtaining the b-phase compensation current reference value according to the b-phase negative sequence current, the b-phase zero sequence current, and the b-phase capacitor voltage control component, and obtaining the c-phase compensation current reference value according to the c-phase negative sequence current, the c-phase zero sequence current, and the c-phase capacitor voltage control component are performed by formulas as follows:

$$I_{a\_ref} = I_a^- + I_a^0 + I_a^*$$

$$I_{b\_ref} = I_b^- + I_b^0 + I_b^*$$

$$I_{c\_ref} = I_c^- + I_c^0 + I_c^*$$

wherein, $I_{a\_ref}$ represents the a-phase compensation current reference value, $I_{b\_ref}$ represents the b-phase compensation current reference value, $I_{c\_ref}$ represents the c-phase compensation current reference value;

$$I_a^-$$

represents the a-phase negative-sequence current, $$I_b^-$$

represents the b-phase negative sequence current, $$I_c^-$$

represents the c-phase negative sequence current;

$$I_a^*$$

represents the a-phase capacitor voltage control component, $$I_b^*$$

represents the b-phase capacitor voltage control component, $I_c^*$ represents the c-phase capacitor voltage control component.

Preferably, the system for unbalance adjustment for inverter split-phase controlling and distribution transformer current further includes a PI controller, wherein the performing the calculation to obtain the a-phase capacitor voltage control component, the b-phase capacitor voltage control component, and the c-phase capacitor voltage according to the voltage between the positive and negative terminals at the first filter capacitor and the second filter capacitor which are connected in series and the preset reference voltage includes:

obtaining a filtered voltage, which is configured to characterize a voltage between the positive terminal and the negative terminal at the first filter capacitor and the second filter capacitor connected in series;

calculating a difference between the filtered voltage and a preset voltage reference value to obtain a capacitor voltage difference;

inputting the capacitor voltage difference into the PI controller to obtain a D-axis active component required for phase coordinate transformation processing.

performing phase coordinate transformation processing according to the D-axis active component and a preset Q-axis reactive component to obtain the a-phase capacitor voltage control component, the b-phase capacitor voltage control component, and the c-phase capacitor voltage control component, wherein, the Q axis reactive component is preset to be zero.

Preferably, the system for unbalance adjustment for inverter split-phase controlling and distribution transformer current further includes a hysteresis controller;

the method further includes:

finding a difference between the a-phase compensation current reference value and the a-phase compensation current to obtain the a-phase compensation current difference, finding the difference between the b-phase compensation current reference value and the b-phase compensation current to obtain the b-phase compensation current difference, and finding the difference between the c-phase compensation current reference value and the c-phase compensation current to obtain the c-phase compensation current difference;

inputting the a-phase compensation current difference, the b-phase compensation current difference, and the c-phase compensation current difference into the hysteresis controller to obtain a switching signal of the three-phase full-bridge inverter;

controlling the three-phase full-bridge inverter to output an a-phase output current, a b-phase output current, and a c-phase output current to the three-phase reactor through the inverter a-phase output terminal, the inverter b-phase output terminal, and the inverter c-phase output terminal, according to the switching signal;

outputting, using the three-phase reactor, the corresponding a-phase compensation current, the corresponding b-phase compensation current, and the corresponding c-phase compensation current to the a-phase line, the b-phase line, and the c-phase line, respectively, according to the a-phase output current, the b-phase output current, and the c-phase output current, so as to perform three-phase unbalance adjustment.

Preferably, in embodiments of the present invention, the method for unbalance adjustment for inverter split-phase controlling and distribution transformer current further includes: when the three-phase load of the distribution transformer is balanced, controlling the three-phase full-bridge inverter such that the a-phase output power output to the a-phase line, the b-phase output power output to the b-phase line, the c-phase output power output to the c-phase line form the three-phase full-bridge inverter are equal, wherein the sum of the a-phase output power, the b-phase output power, and the c-phase output power is equal to the total output power of the distributed photovoltaic power supply.

Implementing the embodiment of the present invention have the following beneficial effects:

in embodiments of the present invention, the system for unbalance adjustment for inverter split-phase controlling and distribution transformer current includes the distributed power supply and the three-phase full-bridge inverter. The three-phase full-bridge inverter is connected to the distributed power supply, and the three-phase full-bridge inverter is connected to the three-phase line through the three-phase reactor. When the unbalance degree corresponding to the three-phase line is greater than the preset starting value, the three-phase compensation current reference value is obtained according to the present front-end three-phase load current, back-end three-phase load current and capacitor voltage control component, such that the three-phase full-bridge inverter can output the three-phase compensation current based on the three-phase compensation current reference value. Therefore, in embodiments of the present invention, the three-phase full-bridge inverter can use the output power of the distributed power supply to output the compensation current required for each phase of the three-phase line, realizing the unbalanced control in the three-phase current of the distribution transformer, so that the three-phase current of the distribution transformer reaches balance.

Other features and advantages of the present invention will be elucidated in the subsequent description, and some will become apparent from the description or understood through the implementation of the present invention. The objectives and further advantages of the present invention can be achieved and obtained through the structures specifically indicated in the specification, claims, and drawings.

BRIEF DESCRIPTION OF DRAWINGS

In order to provide a clearer explanation of the technical solutions in embodiments of the present invention or the prior art, a brief introduction to the drawings required in the description of embodiments or the prior art will be provided below. Clearly, the drawings described below are only for some embodiments of the present invention. Those skilled in the art will understand that additional drawings can be obtained based on these drawings without creative effort.

Among the drawings:

FIG. 5 is a specific flow chart of a method for unbalance adjustment for inverter split-phase controlling and distribution transformer current according to another embodiment of the present invention;

FIG. 6 is a schematic flow chart of phase coordinate transformation processing provided by an embodiment of the present invention;

DETAILED DESCRIPTION OF THE INVENTION

The following will clearly and completely describe the technical solutions in the embodiments of the present invention with reference to the accompanying drawings in the embodiments of the present invention. Obviously, the described embodiments are only some embodiments of the present invention but not all. Based on the embodiments of the present invention, all other embodiments obtained by persons of ordinary skill in the art without creative efforts fall within the protection scope of the present invention.

In embodiments of the present invention, a system and a method for unbalance adjustment for inverter split-phase controlling and distribution transformer current are provided, wherein the system for unbalance adjustment for inverter split-phase controlling and distribution transformer current of embodiments of the present invention includes a distributed power supply and a three-phase full-bridge inverter. The three-phase full-bridge inverter is connected to the distributed power supply, and the three-phase full-bridge inverter is connected to a three-phase line through a three-phase reactor. When an unbalance degree corresponding to the three-phase line is greater than a preset starting value, a three-phase compensation current reference value is obtained according to the present front-end three-phase load current, back-end three-phase load current and capacitor voltage control component, such that the three-phase full-bridge inverter can output the three-phase compensation current based on the three-phase compensation current reference value. Therefore, in embodiments of the present invention, the three-phase full-bridge inverter can use the output power of the distributed power supply to output the compensation current required for each phase of the three-phase line, realizing the unbalanced control in the three-phase current of the distribution transformer, so that the three-phase current of the distribution transformer reaches balance.

For ease of understanding, embodiments of the present invention will be described in detail below in combination with the accompanying drawings.

Figure 1:
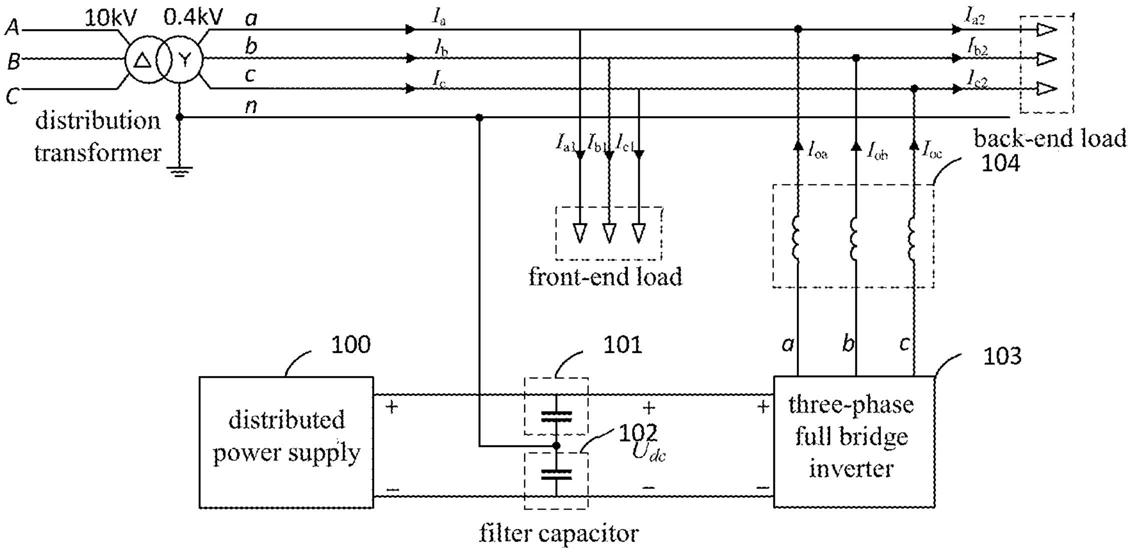
FIG. 1 is a schematic structure diagram of a system for unbalance adjustment for inverter split-phase controlling and distribution transformer current according to an embodiment of the present invention.

Referring is made to FIG. 1, in which FIG. 1 is a schematic structure diagram of a system for unbalance adjustment for inverter split-phase controlling and distribution transformer current according to an embodiment of the present invention. A system for unbalance adjustment for inverter split-phase controlling and distribution transformer current is applied to a power distribution system. The power distribution system includes a distribution transformer and an a-phase line, a b-phase line, a c-phase line, and a neutral line n connected to a low voltage side of the distribution transformer, namely, a load side of the distribution transformer.

Specifically, a front-end load and a back-end load are connected to the three-phase line at the low-voltage side of the distribution transformer. The connection position of the front-end load on the three-phase line is located between the connection positions of the distribution transformer and the three-phase reactor 104 on the three-phase line. The connection position of the back-end load on the three-phase line is located behind the connection position of the three-phase reactor 104 on the three-phase line, so that the connection position of the three-phase reactor 104 on the three-phase line is located between the connection positions of the front-end load and the back-end load on the three-phase line.

Specifically, the system for unbalance adjustment for inverter split-phase controlling and distribution transformer current, provided by embodiments of the present invention, includes a distributed power supply 100 equipped with a positive power output terminal and a negative power output terminal, in which the distributed power supply 100 is used to supply power to the three-phase full-bridge inverter 103.

Specifically, the distributed power supply 100 adopts distributed photovoltaic power supply.

The three-phase full-bridge inverter 103 is provided with a positive inverter input terminal, a negative inverter input terminal, an inverter a-phase output terminal, an inverter b-phase output terminal, and an inverter c-phase output terminal. The positive inverter input terminal is connected to the positive power output terminal, the negative inverter input terminal is connected to the negative power output terminal. The inverter a-phase output terminal, the inverter b-phase output terminal, and the inverter c-phase output terminal are connected to the a-phase line, the b-phase line, and the c-phase line, respectively, through a three-phase reactor 104. The three-phase full-bridge inverter 103 is configured to output corresponding compensation currents to the a-phase line, the b-phase line, and the c-phase line, respectively, through the three-phase reactor 104, so as to perform three-phase unbalance adjustment; the three-phase full-bridge inverter 103 is used to calculate and output the compensation current of each phase of the three-phase line, achieving unbalanced control of the three-phase current, so that the three-phase current on the three-phase line reaches balance.

Specifically, the system for unbalance adjustment for inverter split-phase controlling and distribution transformer current, provided by embodiments of the present invention, further includes a filter module. The filter module includes a first filter capacitor 101 and a second filter capacitor 102. The first filter capacitor 101 is connected to the positive inverter input terminal and the positive power output terminal. The second filter capacitor 102 is connected in series with the first filter capacitor 101. The second filter capacitor 102 is connected to the negative inverter input terminal and the negative power output terminal, and the neutral line n is connected between the first filter capacitor 101 and the second filter capacitor 102.

It should be noted that the three-phase full-bridge inverter 103 can use the output power of the distributed power supply 100 to output the compensation current required by each phase of the three-phase line, so as to realize the unbalance adjustment in the three-phase current, so that the three-phase current on the three-phase line can get balanced.

In an embodiment, when the load current of each phase of the three-phase line is unbalanced, the distributed power supply operates in a maximum power mode. The three-phase full-bridge inverter 103 outputs a compensation current for each phase based on the load currents of three-phase line at the low-voltage side of the distribution transformer, respectively, so as to adjust the current of each phase to a balanced state;

specifically, when the three-phase load currents Ia, Ib, and Ic of the distribution transformer are unbalanced, that is, when the a-phase load current, the b-phase load current, and the c-phase load current on the a-phase line, b-phase line, and c-phase line are unbalanced, with ensuring that the distributed photovoltaic power supply operates in the maximum power generation mode, namely, the total output power P is maximum, the three-phase full-bridge inverter 150 is controlled to output the three-phase compensation currents Ioa, Iob, and Ioc, providing electrical energy for unbalanced loads.

In an embodiment, when the load current of each phase of the three-phase line is balanced, the power output to each phase of the three-phase line by the three-phase full-bridge inverter 103 is equal, and the total output power of the three-phase full-bridge inverter 103 is equal to the total output power of the distributed photovoltaic power supply.

Specifically, when the load currents Ia, Ib, and Ic of the distribution transformer are at the three-phase balanced state, the three-phase balanced power output by the three-phase full-bridge inverter 103 is controlled to satisfy Pa=Pb=Pc=P/3.

Embodiments of the present invention realize the multiplexing of the optimal power generation of the three-phase full-bridge inverter 103 and the three-phase unbalance compensation of the distribution transformer. When the three-phase load of the distribution transformer is balanced, the distributed power supply 100 can be used as a normal power supply for the load, improving the economy of the system. When the distribution transformer is unbalanced in its three phases and the three-phase unbalanced compensation capacity is satisfied, the three-phase inverter can be controlled to output the three-phase unbalanced compensation power and the generated power. It takes into account the three-phase unbalance adjustment of the distribution transformer and the grid connection of the photovoltaic power generation; it realizes the three-phase balance of the distributed photovoltaic and energy storage split-phase grid-connected power generation, management, power distribution and distribution transformers.

It should be noted that, in embodiments of the present invention, the capacitance values of the first filter capacitor 101 and the second filter capacitor 102 are selected according to the actual situation, and the inductance value of the three-phase reactor 104 is selected according to the actual situation. Regarding this, there is no specific restriction in the present application.

The system for unbalance adjustment for inverter split-phase controlling and distribution transformer current and the applied scenarios described in embodiments of the present invention are to illustrate the technical solutions of embodiments of the present invention more clearly, and do not constitute the technical solutions provided for embodiments of the present invention. Those skilled in the art know that with the evolution of the power distribution system and the emergence of new applied scenarios, the technical solutions provided by embodiments of the present invention are also applicable to similar technical problems.

Those skilled in the art can understand that the system for unbalance adjustment for inverter split-phase controlling and distribution transformer current shown in FIG. 1 does not constitute a limitation to embodiments of the present invention, and it may include more or less components, or combinations of certain components, or different arrangements of components, with respect to the illustration.

Figure 2:
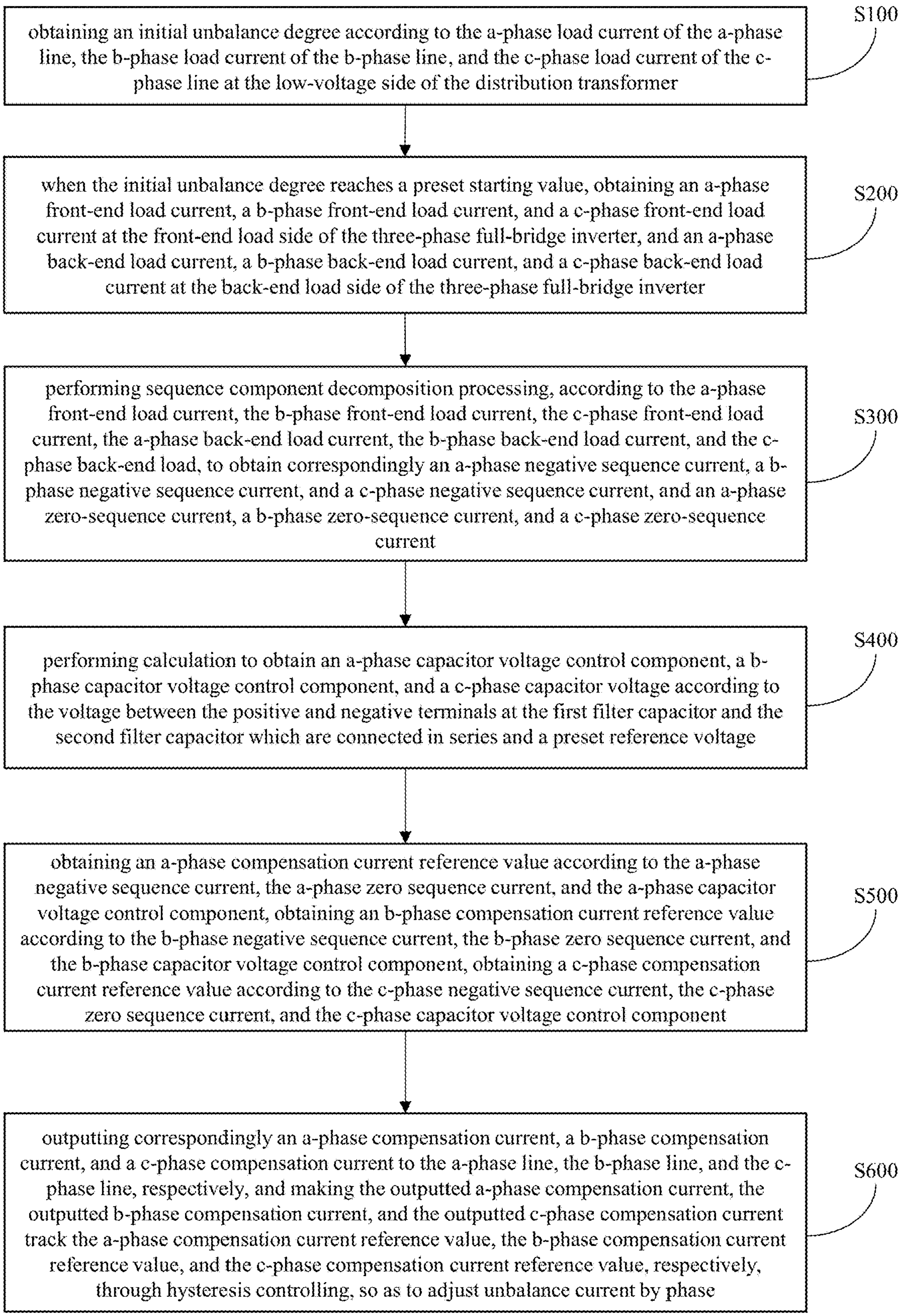
FIG. 2 is a flow chart of a method for unbalance adjustment for inverter split-phase controlling and distribution transformer current according to an embodiment of the present invention.

FIG. 2 is a flow chart of a method for unbalance adjustment for inverter split-phase controlling and distribution transformer current according to an embodiment of the present invention. In the illustration of FIG. 2, the method for unbalance adjustment for inverter split-phase controlling and distribution transformer current includes, but is not limited, steps S100 to S600:

the step S100, obtaining an initial unbalance degree according to the a-phase load current of the a-phase line, the b-phase load current of the b-phase line, and the c-phase load current of the c-phase line at the low-voltage side of the distribution transformer;

the step S200, when the initial unbalance degree reaches a preset starting value, obtaining an a-phase front-end load current, a b-phase front-end load current, and a c-phase front-end load current at the front-end load side of the three-phase full-bridge inverter, and an a-phase back-end load current, a b-phase back-end load current, and a c-phase back-end load current at the back-end load side of the three-phase full-bridge inverter;

the step S300, performing sequence component decomposition processing, according to the a-phase front-end load current, the b-phase front-end load current, the c-phase front-end load current, the a-phase back-end load current, the b-phase back-end load current, and the c-phase back-end load, to obtain correspondingly an a-phase negative sequence current, a b-phase negative sequence current, and a c-phase negative sequence current, and an a-phase zero-sequence current, a b-phase zero-sequence current, and a c-phase zero-sequence current;

the step S400, performing calculation to obtain an a-phase capacitor voltage control component, a b-phase capacitor voltage control component, and a c-phase capacitor voltage according to the voltage between the positive and negative terminals at the first filter capacitor and the second filter capacitor which are connected in series and a preset reference voltage;

the step S500, obtaining an a-phase compensation current reference value according to the a-phase negative sequence current, the a-phase zero sequence current, and the a-phase capacitor voltage control component, obtaining an b-phase compensation current reference value according to the b-phase negative sequence current, the b-phase zero sequence current, and the b-phase capacitor voltage control component, obtaining a c-phase compensation current reference value according to the c-phase negative sequence current, the c-phase zero sequence current, and the c-phase capacitor voltage control component;

the step S600, outputting correspondingly an a-phase compensation current, a b-phase compensation current, and a c-phase compensation current to the a-phase line, the b-phase line, and the c-phase line, respectively, and making the outputted a-phase compensation current, the outputted b-phase compensation current, and the outputted c-phase compensation current track the a-phase compensation current reference value, the b-phase compensation current reference value, and the c-phase compensation current reference value, respectively, through hysteresis controlling, so as to adjust unbalance current by phase.

By the system for unbalance adjustment for inverter split-phase controlling and distribution transformer current of embodiments of the present invention, when the unbalance degree corresponding to the three-phase line is greater than the preset starting value, according to the present front-end three-phase load current, the present back-end three-phase load current, and the present capacitor voltage control component, the three-phase compensation current reference value can be obtained, so that the three-phase full-bridge inverter can output the three-phase compensation current based on the three-phase compensation current reference value. Therefore, the three-phase full-bridge inverter can use the output power of the photovoltaic power supply to output the compensation current required by each phase of the three-phase line, so as to achieve unbalanced control of the three-phase current and balance the three-phase current on the three-phase line; accordingly, in embodiments of the present invention, it can realize full compensation in the three-phase unbalanced current on the load side, reducing the loss of the three-phase line and improving the power quality of the power distribution system.

Specifically, in the present embodiment, when the initial unbalance reaches the preset starting value, it indicates that three-phase unbalance occurs in the power system, in which the initial unbalance degree is obtained according to the a-phase load current of the a-phase line, the b-phase load current of the b-phase line, and the c-phase load current of the c-phase line.

Specifically, when three-phase imbalance is detected, a power supply control signal is output, so that the photovoltaic power module operates in a maximum power generation mode, making the photovoltaic power module output the maximum power.

Figure 3:
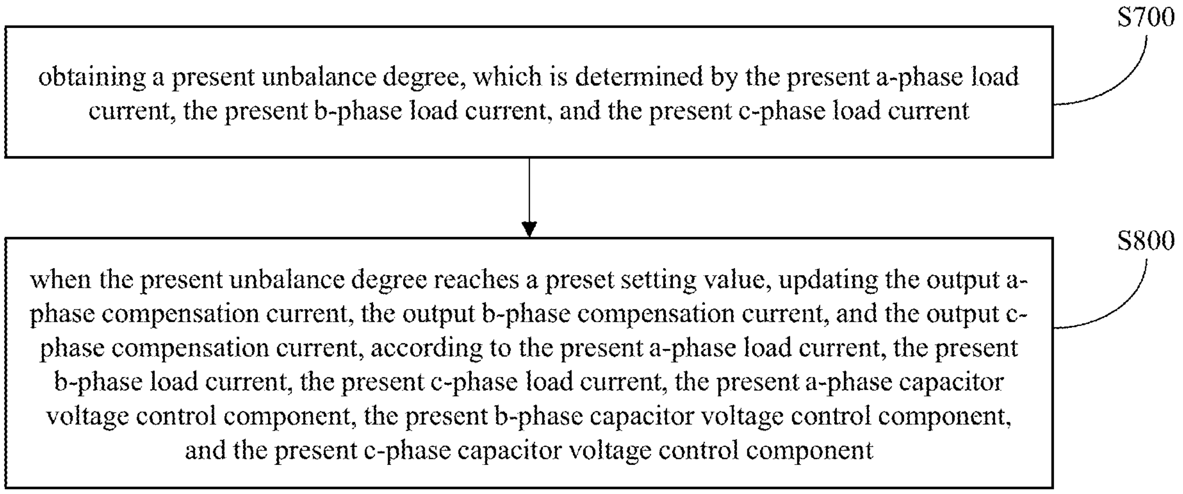
FIG. 3 is a specific flow chart of a method for unbalance adjustment for inverter split-phase controlling and distribution transformer current according to an embodiment of the present invention.

Referring is made to FIG. 3. In embodiments of the present invention, the method for unbalance adjustment for inverter split-phase controlling and distribution transformer current further includes steps S700 to S800:

the step S700, obtaining a present unbalance degree, which is determined by the present a-phase load current, the present b-phase load current, and the present c-phase load current;

the step S800, when the present unbalance degree reaches a preset setting value, updating the output a-phase compensation current, the output b-phase compensation current, and the output c-phase compensation current, according to the present a-phase load current, the present b-phase load current, the present c-phase load current, the present a-phase capacitor voltage control component, the present b-phase capacitor voltage control component, and the present c-phase capacitor voltage control component.

By detecting the present unbalance degree multiple times during the adjustment process, the compensation current reference value can be iterated to adapt to the present unbalance situation, thereby making the adjustment process more accurate.

Specifically, the setting value is preset to 5%.

Figure 4:
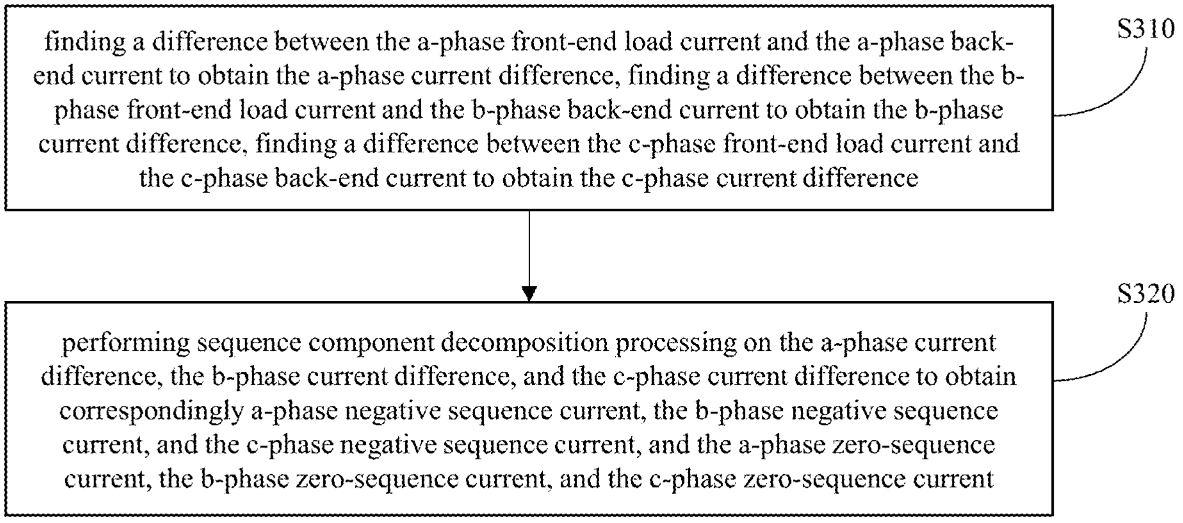
FIG. 4 is a specific flow chart of a method for unbalance adjustment for inverter split-phase controlling and distribution transformer current according to another embodiment of the present invention.

Referring is made to FIG. 4, in which the step S300 further includes, but is not limited, a step S310 and a step S320:

The step S310, finding a difference between the a-phase front-end load current and the a-phase back-end current to obtain the a-phase current difference, finding a difference between the b-phase front-end load current and the b-phase back-end current to obtain the b-phase current difference, finding a difference between the c-phase front-end load current and the c-phase back-end current to obtain the c-phase current difference;

The step S320, performing sequence component decomposition processing on the a-phase current difference, the b-phase current difference, and the c-phase current difference to obtain correspondingly a-phase negative sequence current, the b-phase negative sequence current, and the c-phase negative sequence current, and the a-phase zero-sequence current, the b-phase zero-sequence current, and the c-phase zero-sequence current.

Specifically, when the three-phase load of the distribution transformer is unbalanced, the three-phase currents Ia1, Ib1, and Ic1 on the front-end load side and the three-phase currents Ia2, Ib2, and Ic2 on the back-end load side are detected through remote communication; a difference between Ia1 and Ia2, a difference between Ib1 and Ib2, and a difference between Ic1 and Ic2 are calculated, and the differences are calculated, according to the current sequence component decomposition, to obtain the negative sequence current $$I_a^-, I_b^-, I_c^-$$

and the zero sequence currents $$I_a^0, I_b^0, I_c^0,$$

which needs to be compensated.

In one embodiment, the negative sequence current and zero sequence current superimpose the capacitor voltage control components Ia*, Ib*, Ic*, so as to obtain the compensation current reference values Ia_ref, Ib_ref, Ic_ref; by making the actual compensation current output by the three-phase full-bridge inverter track the compensation current reference values Ia_ref, Ib_ref, and Ic_ref, the actual output compensation currents Ioa, Iob, and Ioc are obtained.

Specifically, the obtaining the a-phase compensation current reference value according to the a-phase negative sequence current, the a-phase zero sequence current, and the a-phase capacitor voltage control component, obtaining the b-phase compensation current reference value according to the b-phase negative sequence current, the b-phase zero sequence current, and the b-phase capacitor voltage control component, and obtaining the c-phase compensation current reference value according to the c-phase negative sequence current, the c-phase zero sequence current, and the c-phase capacitor voltage control component are performed by formulas as follows:

$$I_{a\_ref} = I_a^- + I_a^0 + I_a^*$$

$$I_{b\_ref} = I_b^- + I_b^0 + I_b^*$$

$$I_{c\_ref} = I_c^- + I_c^0 + I_c^*$$

wherein, $I_{a\_ref}$ represents the a-phase compensation current reference value, $I_{b\_ref}$ represents the b-phase compensation current reference value, $I_{c\_ref}$ represents the c-phase compensation current reference value;

$$I_a^-$$

represents the a-phase negative-sequence current, $$I_b^-$$

represents the b-phase negative sequence current, $$I_c^-$$

represents the c-phase negative sequence current;

$$I_a^*$$

represents the a-phase capacitor voltage control component, $$I_b^*$$

represents the b-phase capacitor voltage control component, $$I_c^*$$

represents the c-phase capacitor voltage control component.

In one embodiment, a system for unbalance adjustment for inverter split-phase controlling and distribution transformer current of embodiments of the present invention is further provided with a linear controller.

Specifically, the linear controller is achieved by using a Proportional Integral controller (PI controller), wherein the capacitor voltage difference is adjusted through the PI controller to obtain a D-axis active component required for the phase coordinate transformation processing.

Referring is made to FIG. 5, in which the step S400 further includes, but is not limited, a step S410 to a step S430:

the step S410, obtaining a filtered voltage, which is configured to characterize a voltage between the positive terminal and the negative terminal at the first filter capacitor and the second filter capacitor connected in series;

the step S420, calculating a difference between the filtered voltage and a preset voltage reference value to obtain a capacitor voltage difference;

the step S430, inputting the capacitor voltage difference into the PI controller to obtain a D-axis active component required for phase coordinate transformation processing;

the step S440, performing phase coordinate transformation processing according to the D-axis active component and a preset Q-axis reactive component to obtain the a-phase capacitor voltage control component, the b-phase capacitor voltage control component, and the c-phase capacitor voltage control component, wherein, the Q axis reactive component is preset to be zero.

Referring is made to FIG. 6, in which FIG. 6 is a schematic flow chart of phase coordinate transformation processing provided by an embodiment of the present invention. Specifically, the filter voltage is the voltage difference between the positive and negative terminals of the first filter capacitor and the second filter capacitor connected in series, which is represented by $U_{dc}$. The preset voltage reference value is the voltage reference value of the positive and negative terminals of the first filter capacitor and the second filter capacitor which are connected in series, which is represented by $U_{dc\_ref}$. The difference between the filtered voltage and the preset voltage reference value is calculated to obtain the reference voltage difference. The obtained reference voltage difference is input to the PI controller to obtain the active component parameters. The active component parameters are configured to characterize the d-axis active component required for the phase coordinate transformation processing. Then dq/abc coordinate transformation processing is performed according to the active component parameters and the preset reactive component parameters to obtain the capacitor voltage control component, wherein, the reactive component parameters are configured to characterize the q-axis reactive component required for the phase coordinate transformation processing, in which the reactive component parameter is set to 0. The dq/abc transformation can be applied to obtaining the capacitor voltage control components $$I_a^*, I_b^*, I_c^*.$$

Specifically, Park's Transformation is used to perform dq/abc transformation processing.

In one embodiment, a system for unbalance adjustment for inverter split-phase controlling and distribution transformer current according to an embodiment of the present invention is further provided with a hysteresis controller for sending a switching signal to the three-phase full-bridge inverter. The three-phase full-bridge inverter tracks the compensation current reference value according to the switching signal.

Figure 7:
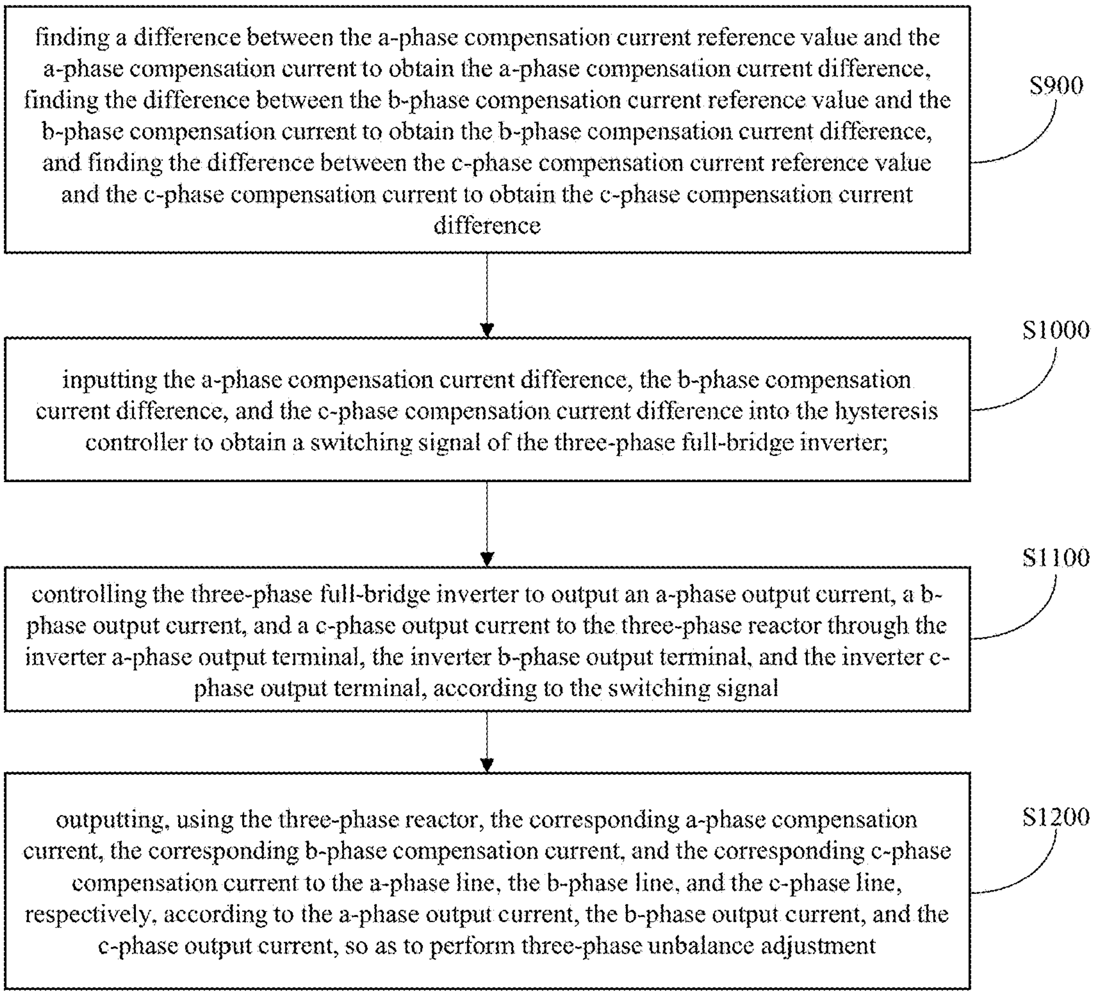
FIG. 7 is a specific flow chart of a method for unbalance adjustment for inverter split-phase controlling and distribution transformer current according to another embodiment of the present invention.

Referring is made to FIG. 7, embodiments of the present invention further include steps S900 to S1200:

the step S900, finding a difference between the a-phase compensation current reference value and the a-phase compensation current to obtain the a-phase compensation current difference, finding the difference between the b-phase compensation current reference value and the b-phase compensation current to obtain the b-phase compensation current difference, and finding the difference between the c-phase compensation current reference value and the c-phase compensation current to obtain the c-phase compensation current difference;

the step S1000, inputting the a-phase compensation current difference, the b-phase compensation current difference, and the c-phase compensation current difference into the hysteresis controller to obtain a switching signal of the three-phase full-bridge inverter;

the step S1100, controlling the three-phase full-bridge inverter to output an a-phase output current, a b-phase output current, and a c-phase output current to the three-phase reactor through the inverter a-phase output terminal, the inverter b-phase output terminal, and the inverter c-phase output terminal, according to the switching signal;

the step S1200, outputting, using the three-phase reactor, the corresponding a-phase compensation current, the corresponding b-phase compensation current, and the corresponding c-phase compensation current to the a-phase line, the b-phase line, and the c-phase line, respectively, according to the a-phase output current, the b-phase output current, and the c-phase output current, so as to perform three-phase unbalance adjustment.

Specifically, the switching signal of the three-phase full-bridge inverter are obtained from getting differences between Ia_ref and Ioa, between Ib_ref and Job, between Ic_ref and Ioc, and the differences are sent to the hysteresis controller, respectively, so as to make the hysteresis controller output the switching signal of the three-phase full-bridge inverter. Accordingly, the actual compensation current Ioa, Iob, Ioc are obtained and output by tracking the current reference values Ia_ref, Ib_ref, Ic_ref through the hysteresis controlling.

In one embodiment, a method for unbalance adjustment for inverter split-phase controlling and distribution transformer current according to embodiments of the present invention further includes, when the three-phase load of the distribution transformer is balanced, controlling the three-phase full-bridge inverter such that the a-phase output power output to the a-phase line, the b-phase output power output to the b-phase line, the c-phase output power output to the c-phase line form the three-phase full-bridge inverter are equal, in which the sum of the a-phase output power, the b-phase output power, and the c-phase output power is equal to the total output power of the distributed photovoltaic power supply.

Figure 8:
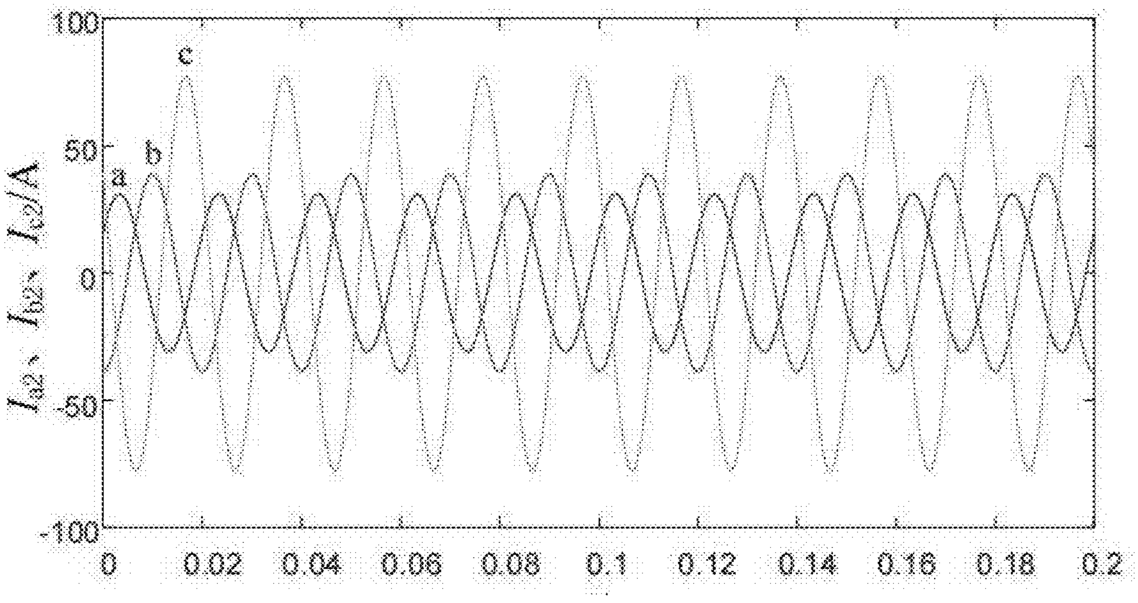
FIG. 8 is a three-phase unbalanced current waveform diagram of a back-end load provided by a specific example of the present invention.
Figure 9:
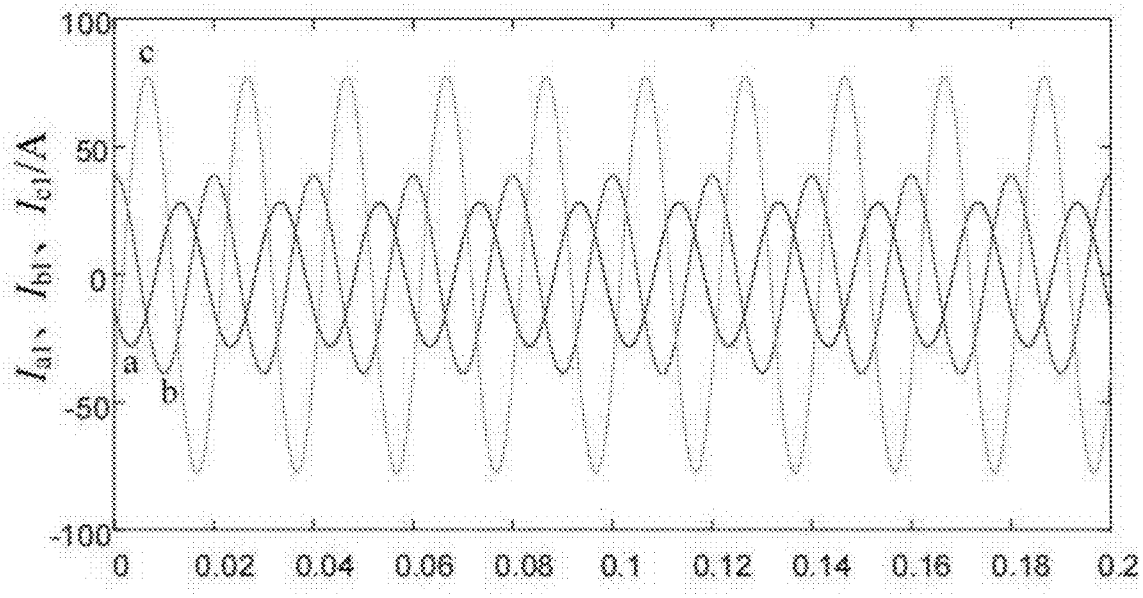
FIG. 9 is a three-phase unbalanced current waveform diagram of a front-end load provided by a specific example of the present invention.
Figure 10:
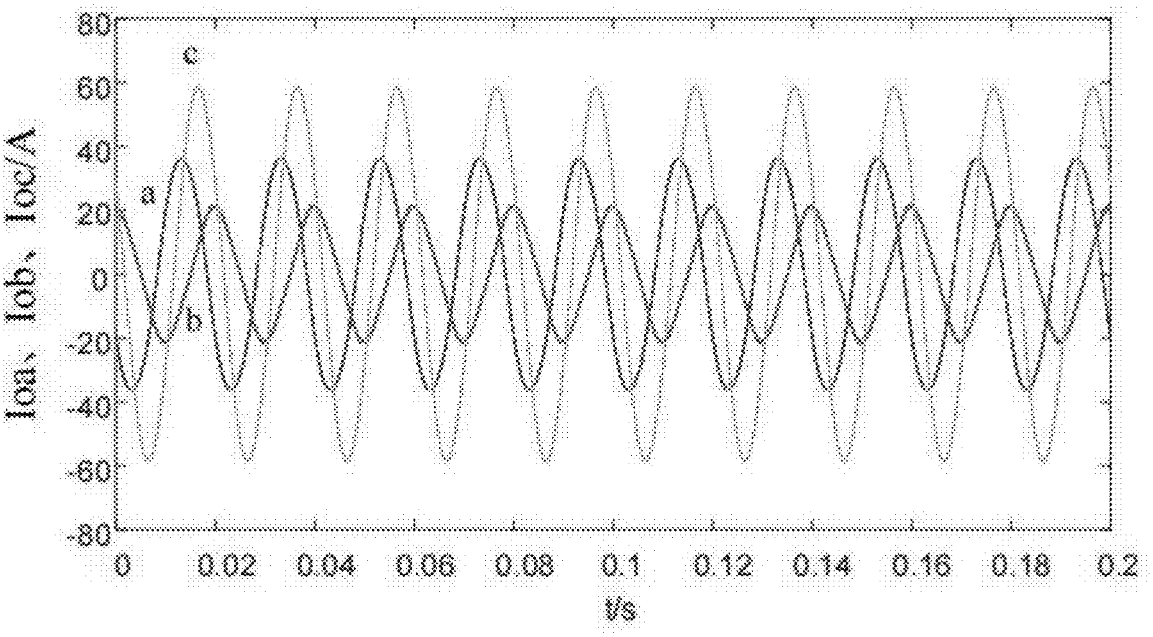
FIG. 10 is an output current waveform diagram of a three-phase full-bridge inverter provided by a specific example of the present invention.
Figure 11:
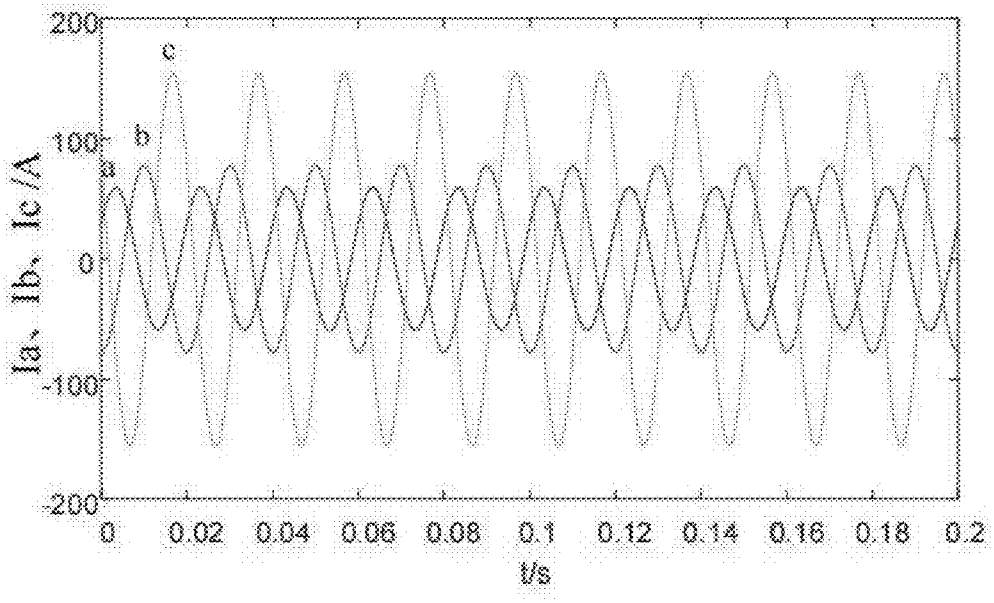
FIG. 11 is a current waveform diagram of a three-phase line before current compensation provided by a specific example of the present invention.
Figure 12:
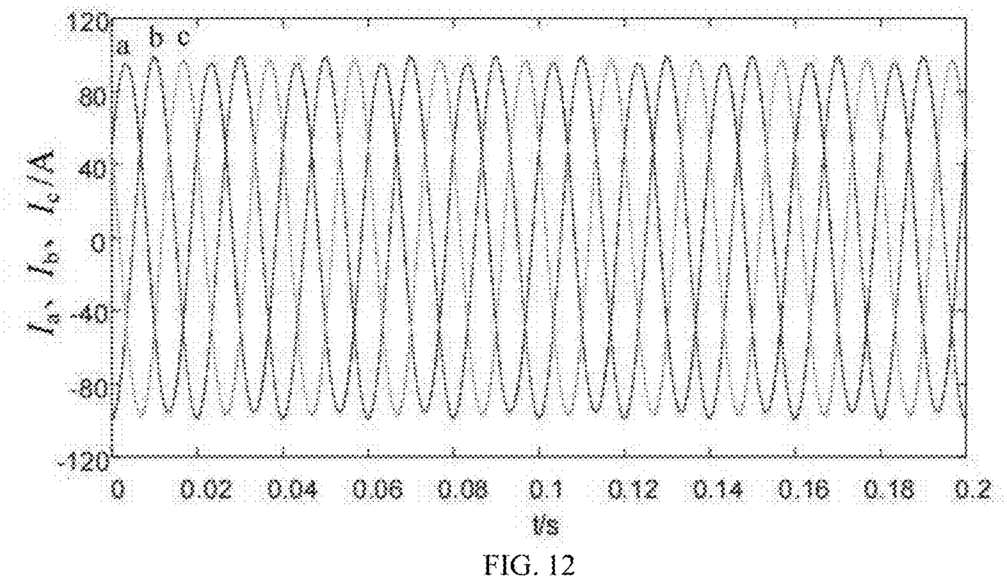
FIG. 12 is a current waveform diagram of a three-phase line after medium current compensation provided by a specific example of the present invention.

Referring is made to FIG. 8 to FIG. 12. FIG. 8 is a three-phase unbalanced current waveform diagram of a back-end load provided by a specific example of the present invention. FIG. 9 is a three-phase unbalanced current waveform diagram of a front-end load provided by a specific example of the present invention. FIG. 10 is an output current waveform diagram of a three-phase full-bridge inverter provided by a specific example of the present invention. FIG. 11 is a current waveform diagram of a three-phase line before current compensation provided by a specific example of the present invention. FIG. 12 is a current waveform diagram of a three-phase line after current compensation provided by a specific example of the present invention.

It can be found from FIG. 8 to FIG. 12, in a specific example of the present invention, when the load current on the three-phase line is in an unbalanced state, the current unbalance degree is 37.2%. After adjustment by the method for unbalance adjustment for inverter split-phase controlling and distribution transformer current as above-mentioned, the load current on the three-phase line is in a balance status, with the imbalance degree of 1.8%. Therefore, the technical solutions of embodiments of the present invention can fully realize the three-phase balance of the distribution transformer.

Embodiments of the present invention further provide a device for unbalanced current in a distribution transformer by split-phase control adjustment, including:

at least one memory;

at least one processor;

at least one computer program;

in which the computer program is stored in the memory, and the processor executes the at least one computer program to achieve the method for unbalance adjustment for inverter split-phase controlling and distribution transformer current of the embodiments of the present disclosure, as described above. The computer device can be any smart terminal including a mobile phone, a tablet computer, a personal digital assistant (Personal Digital Assistant, PDA), or a vehicle-mounted computer, etc.

Figure 13:
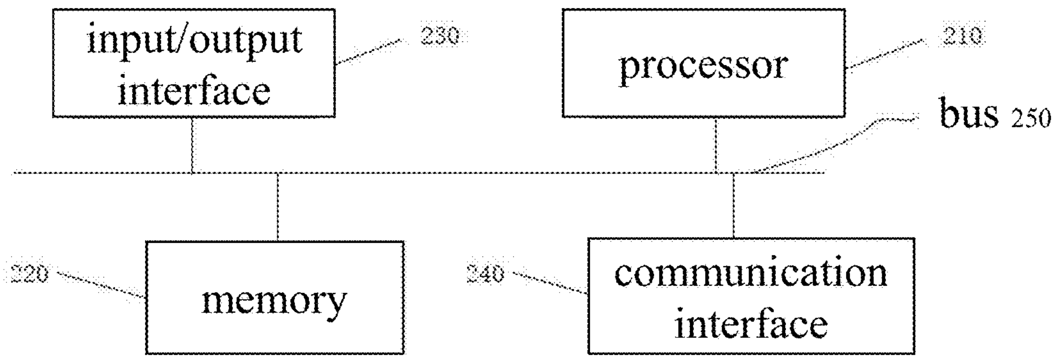
FIG. 13 is a schematic structural diagram of a device for unbalanced current in a distribution transformer by split-phase control adjustment provided an embodiment of the present invention.

Specifically, referring to FIG. 13, a device for unbalanced current in a distribution transformer by split-phase control adjustment of an embodiment of the present invention includes:

a processor 210 which can be implemented by a general central processing unit (Central Processing Unit, CPU), a microprocessor, an application specific integrated circuit (Application Specific Integrated Circuit, ASIC), or one or more integrated circuits, wherein it is used to execute relevant programs so as to implement the technical solutions provided by embodiments of the present disclosure;

a memory 220 which can be implemented in the form of read only memory (Read Only Memory, ROM), static storage device, dynamic storage device, or random access memory (Random Access Memory, RAM). The memory 220 can store operating systems and other application programs. When implementing the technical solutions provided by the embodiments of this specification through software or firmware, the relevant program codes are stored in the memory 220 and called by the processor 210 to execute the method for the unbalanced current adjustment from the capacity increase and the phase-splitting output of the distribution transformer of embodiments of the present invention;

an input/output interface 230 which is used to implement information input and output;

a communication interface 240 which is used to realize communication and interaction between the present device and other devices, in which communication can be achieved through wired methods (such as USB, network cables, etc.) or wirelessly (such as mobile networks, WIFI, Bluetooth, etc.);

a bus 250 which transmits information between various components of the device (such as processor 210, memory 220, input/output interface 230, and communication interface 240);

wherein, the processor 210, the memory 220, the input/output interface 230, and the communication interface 240 implement communication connections between each other inside the device through the bus 250.

Embodiments of the present invention further provide a computer-readable storage medium. The computer-readable storage medium stores computer-executable instructions, and the computer-executable instructions are used to enable the computer to perform the above-mentioned method for unbalance adjustment for inverter split-phase controlling and distribution transformer current.

As a non-transitory computer-readable storage medium, memory can be used to store non-transitory software programs and non-transitory computer executable programs. In addition, the memory may include high-speed random access memory, and may also include non-transitory memory, such as at least one magnetic disk storage device, flash memory device, or other non-transitory solid-state storage devices. In some embodiments, the memory optionally includes memory located remotely from the processor, and these remote memories may be connected to the processor via a network. Examples of the above-mentioned networks include but are not limited to the Internet, intranets, local area networks, mobile communication networks and combinations thereof.

The embodiments described in this disclosure are intended to provide a clearer understanding of the technical solutions presented in this disclosure and do not constitute limitations on the technical solutions provided herein. Those skilled in the art can understand that with the evolution of technology and the emergence of new application scenarios, the technical solutions provided in this disclosure are equally applicable to similar technical problems.

It is understood by those skilled in the art that the technical solutions depicted in the figures do not constitute limitations on this disclosure. These solutions may include more or fewer steps than depicted in the figures, or certain steps may be combined, or different steps altogether.

The device embodiments described above are merely illustrative. Units indicated as separate components may or may not be physically separated, meaning they can be located in the same place or distributed across multiple network units. Depending on actual needs, a portion or all of the modules can be selected to implement the objectives of the disclosed embodiments.

Those skilled in the art can understand that all or some steps in the methods described in the preceding text, as well as the functional modules/units in the systems or devices, can be implemented as software, firmware, hardware, or a suitable combination thereof.

The terms "first," "second," "third." "fourth," etc. (if present) in the specification and the accompanying drawings are used to distinguish similar objects and need not necessarily denote a specific order or sequence. The use of these numbers should be understood as interchangeable, where applicable, so that the embodiments described herein can be implemented in an order different from that depicted or described here. Furthermore, the terms "comprising" and "having." and their variations, intend to cover non-exclusive inclusion. For example, processes, methods, systems, products, or devices including a series of steps or units need not be limited to those steps or units explicitly listed, but may include other steps or units inherently related to these processes, methods, products, or devices.

It should be understood that in this application, "at least one" refers to one or more, and "multiple" refers to two or more. "And/or," when used to describe the relationship between associated objects, represents the possibility of three relationships, namely, the existence of only A, the existence of only B, and the simultaneous existence of A and B. The character "/" generally indicates an "or" relationship between the associated objects. Expressions such as "at least one of the following" or similar expressions refer to any combination of these items, including any combination of one or more items, such as a, b, or c. For example, "at least one of a, b, or c" can represent: a, b, c. "a and b." "a and c," "b and c." or "a and b and c," where a, b, c can be singular or plural.

In several embodiments provided in the present application, it should be understood that the disclosed systems, devices, and methods can be implemented in other ways. For example, the described device embodiments are only illustrative. The division of units, such as the segmentation of units, is just a logical functional division, and actual implementation can involve alternative divisions. Multiple units or components can be combined or integrated into another system, and certain features can be ignored or left unexecuted. Additionally, the displayed or discussed couplings, direct couplings, or communication connections between elements can also be indirect couplings or communication connections through interfaces, devices, or units, and these connections can be electrical, mechanical, or of other forms.

Units described as separate components can physically be separate or not. Units displayed as individual components can be physical units or not, meaning they can be located in one place or distributed across multiple network units. Depending on the specific requirements, some or all of the units can be selected to achieve the purpose of the embodiments.

Furthermore, functional units in various embodiments of the present application can be integrated into one processing unit, or they can physically exist as separate units or integrated within one unit. These integrated units can be implemented in hardware form or as software functional units.

If the integrated units are implemented in the form of software functional units and sold or used as standalone products, they can be stored in a computer-readable storage medium. Based on this understanding, the technological aspects of this application, which essentially contribute to or fully or partially embody the solutions, can also be embodied in the form of software products. These computer software products are stored in a storage medium and include instructions to enable a computing device (which can be a personal computer, server, or network device, among others) to execute all or part of the steps of the various embodiments described in this application. The aforementioned storage media can include USB drives, external hard drives, Read-Only Memory (ROM), Random Access Memory (RAM), magnetic disks, optical disks, and various other media capable of storing program code.

The above-disclosed embodiments represent preferred embodiments of the present invention. However, these embodiments should not be seen as limiting the scope of the present invention. Therefore, any equivalent changes made in accordance with the claims of the present invention are still within the scope of the present invention.

What is claimed is:

1. A method for unbalance adjustment for inverter split-phase controlling and distribution transformer current, which is applied to a system for unbalance adjustment for inverter split-phase controlling and distribution transformer current, wherein the system comprises:

a distribution transformer and an a-phase line, a b-phase line, a c-phase line, and a neutral line n connected to a low voltage side of the distribution transformer, wherein the system for unbalance adjustment for inverter split-phase controlling and distribution transformer current comprises:

a distributed power supply equipped with a positive power output terminal and a negative power output terminal;

a three-phase full-bridge inverter provided with a positive inverter input terminal, a negative inverter input terminal, an inverter a-phase output terminal, an inverter b-phase output terminal, and an inverter c-phase output terminal, wherein the positive inverter input terminal is connected to the positive power output terminal, the negative inverter input terminal is connected to the negative power output terminal, the inverter a-phase output terminal, the inverter b-phase output terminal, and the inverter c-phase output terminal are connected to the a-phase line, the b-phase line, and the c-phase line, respectively, through a three-phase reactor; wherein the three-phase full-bridge inverter is configured to output corresponding compensation currents to the a-phase line, the b-phase line, and the c-phase line, respectively, through the three-phase reactor, so as to perform three-phase unbalance adjustment;

a first filter capacitor connected to the positive inverter input terminal and the positive power output terminal;

a second filter capacitor connected in series with the first filter capacitor, wherein the second filter capacitor is connected to the negative inverter input terminal and the negative power output terminal, and the neutral line n is connected between the first filter capacitor and the second filter capacitor;

wherein the method comprises:

obtaining an initial unbalance degree according to an a-phase load current of the a-phase line, a b-phase load current of the b-phase line, and a c-phase load current of the c-phase line at a low-voltage side of the distribution transformer;

when the initial unbalance degree reaches a preset starting value, obtaining an a-phase front-end load current, a b-phase front-end load current, and a c-phase front-end load current at the front-end load side of the three-phase full-bridge inverter, and an a-phase back-end load current, a b-phase back-end load current, and a c-phase back-end load current at the back-end load side of the three-phase full-bridge inverter;

performing sequence component decomposition processing, according to the a-phase front-end load current, the b-phase front-end load current, the c-phase front-end load current, the a-phase back-end load current, the b-phase back-end load current, and the c-phase back-end load, to obtain correspondingly an a-phase negative sequence current, a b-phase negative sequence current, and a c-phase negative sequence current, and an a-phase zero-sequence current, a b-phase zero-sequence current, and a c-phase zero-sequence current;

performing calculation to obtain an a-phase capacitor voltage control component, a b-phase capacitor voltage control component, and a c-phase capacitor voltage according to the voltage between the positive and negative terminals at the first filter capacitor and the second filter capacitor which are connected in series and a preset reference voltage;

obtaining an a-phase compensation current reference value according to the a-phase negative sequence current, the a-phase zero sequence current, and the a-phase capacitor voltage control component, obtaining an b-phase compensation current reference value according to the b-phase negative sequence current, the b-phase zero sequence current, and the b-phase capacitor voltage control component, obtaining a c-phase compensation current reference value according to the c-phase negative sequence current, the c-phase zero sequence current, and the c-phase capacitor voltage control component;

outputting correspondingly an a-phase compensation current, a b-phase compensation current, and a c-phase compensation current to the a-phase line, the b-phase line, and the c-phase line, respectively, and making the outputted a-phase compensation current, the outputted b-phase compensation current, and the outputted c-phase compensation current track the a-phase compensation current reference value, the b-phase compensation current reference value, and the c-phase compensation current reference value, respectively, through hysteresis controlling, so as to adjust unbalance current by phase.

2. The method for unbalance adjustment for inverter split-phase controlling and distribution transformer current of claim 1, further comprising:

obtaining a present unbalance degree, which is determined by the present a-phase load current, the present b-phase load current, and the present c-phase load current;

wherein, when the present unbalance degree reaches a preset setting value, updating the output a-phase compensation current, the output b-phase compensation current, and the output c-phase compensation current, according to the present a-phase load current, the present b-phase load current, the present c-phase load current, the present a-phase capacitor voltage control component, the present b-phase capacitor voltage control component, and the present c-phase capacitor voltage control component.

3. The method for unbalance adjustment for inverter split-phase controlling and distribution transformer current of claim 2, wherein the system for unbalance adjustment for inverter split-phase controlling and distribution transformer current further includes a PI controller, wherein the performing the calculation to obtain the a-phase capacitor voltage control component, the b-phase capacitor voltage control component, and the c-phase capacitor voltage according to the voltage between the positive and negative terminals at the first filter capacitor and the second filter capacitor which are connected in series and the preset reference voltage comprises:

obtaining a filtered voltage, which is configured to characterize a voltage between the positive terminal and the negative terminal at the first filter capacitor and the second filter capacitor connected in series;

calculating a difference between the filtered voltage and a preset voltage reference value to obtain a capacitor voltage difference;

inputting the capacitor voltage difference into the PI controller to obtain a D-axis active component required for phase coordinate transformation processing;

performing phase coordinate transformation processing according to the D-axis active component and a preset Q-axis reactive component to obtain the a-phase capacitor voltage control component, the b-phase capacitor voltage control component, and the c-phase capacitor voltage control component, wherein, the Q axis reactive component is preset to be zero.

4. The method for unbalance adjustment for inverter split-phase controlling and distribution transformer current of claim 1, wherein the performing the sequence component decomposition processing, according to the a-phase front-end load current, the b-phase front-end load current, the c-phase front-end load current, the a-phase back-end load current, the b-phase back-end load current, and the c-phase back-end load, to obtain correspondingly an a-phase negative sequence current, a b-phase negative sequence current, and a c-phase negative sequence current, and the a-phase zero-sequence current, the b-phase zero-sequence current, and the c-phase zero-sequence current comprises:

finding a difference between the a-phase front-end load current and the a-phase back-end current to obtain the a-phase current difference, finding a difference between the b-phase front-end load current and the b-phase back-end current to obtain the b-phase current difference, finding a difference between the c-phase front-end load current and the c-phase back-end current to obtain the c-phase current difference;

performing sequence component decomposition processing on the a-phase current difference, the b-phase current difference, and the c-phase current difference to obtain correspondingly a-phase negative sequence current, the b-phase negative sequence current, and the c-phase negative sequence current, and the a-phase zero-sequence current, the b-phase zero-sequence current, and the c-phase zero-sequence current.

5. The method for unbalance adjustment for inverter split-phase controlling and distribution transformer current of claim 1, wherein the obtaining the a-phase compensation current reference value according to the a-phase negative sequence current, the a-phase zero sequence current, and the a-phase capacitor voltage control component, obtaining the b-phase compensation current reference value according to the b-phase negative sequence current, the b-phase zero sequence current, and the b-phase capacitor voltage control component, and obtaining the c-phase compensation current reference value according to the c-phase negative sequence current, the c-phase zero sequence current, and the c-phase capacitor voltage control component are performed by formulas as follows:

$$I_{a\_ref} = I_a^- + I_a^0 + I_a^*$$

$$I_{b\_ref} = I_b^- + I_b^0 + I_b^*$$

$$I_{c\_ref} = I_c^- + I_c^0 + I_c^*$$

wherein, $I_{a\_ref}$ represents the a-phase compensation current reference value, $I_{b\_ref}$ represents the b-phase compensation current reference value, $I_{c\_ref}$ represents the c-phase compensation current reference value;

$$I_a^-$$

represents the a-phase negative sequence current, $$I_b^-$$

represents the b-phase negative sequence current, $$I_c^-$$

represents the c-phase negative sequence current; $I_a^*$ represents the a-phase capacitor voltage control component, $I_b^*$ represents the b-phase capacitor voltage control component, $I_c^*$ represents the c-phase capacitor voltage control component.

6. The method for unbalance adjustment for inverter split-phase controlling and distribution transformer current of claim 1, wherein the method further comprises:

finding a difference between the a-phase compensation current reference value and the a-phase compensation current to obtain the a-phase compensation current difference, finding the difference between the b-phase compensation current reference value and the b-phase compensation current to obtain the b-phase compensation current difference, and finding the difference between the c-phase compensation current reference value and the c-phase compensation current to obtain the c-phase compensation current difference;

inputting the a-phase compensation current difference, the b-phase compensation current difference, and the c-phase compensation current difference into the hysteresis controller to obtain a switching signal of the three-phase full-bridge inverter;

controlling the three-phase full-bridge inverter to output an a-phase output current, a b-phase output current, and a c-phase output current to the three-phase reactor through the inverter a-phase output terminal, the inverter b-phase output terminal, and the inverter c-phase output terminal, according to the switching signal;

outputting, using the three-phase reactor, the corresponding a-phase compensation current, the corresponding b-phase compensation current, and the corresponding c-phase compensation current to the a-phase line, the b-phase line, and the c-phase line, respectively, according to the a-phase output current, the b-phase output current, and the c-phase output current, so as to perform three-phase unbalance adjustment.

7. The method for unbalance adjustment for inverter split-phase controlling and distribution transformer current of claim 1, further comprising:

when the three-phase load of the distribution transformer is balanced, controlling the three-phase full-bridge inverter such that the a-phase output power output to the a-phase line, the b-phase output power output to the b-phase line, the c-phase output power output to the c-phase line form the three-phase full-bridge inverter are equal, wherein the sum of the a-phase output power, the b-phase output power, and the c-phase output power is equal to the total output power of the distributed photovoltaic power supply.

* * * * *